(12) United States Patent
Dar et al.

(10) Patent No.: US 10,318,480 B2
(45) Date of Patent: Jun. 11, 2019

(54) SYSTEM AND METHOD FOR EFFICIENT INODE ENUMERATION

(75) Inventors: Itay Dar, Rishon le zion (IL); Jacob Cherian, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 887 days.

(21) Appl. No.: 13/267,208

(22) Filed: Oct. 6, 2011

(65) Prior Publication Data

US 2013/0091185 A1    Apr. 11, 2013

(51) Int. Cl.
     *G06F 3/06*      (2006.01)
     *G06F 16/13*      (2019.01)
     *G06F 16/14*      (2019.01)

(52) U.S. Cl.
     CPC .............. *G06F 16/13* (2019.01); *G06F 3/064* (2013.01); *G06F 3/0643* (2013.01); *G06F 16/14* (2019.01)

(58) Field of Classification Search
     CPC ........ G06F 3/0644; G06F 17/30; G06F 3/064; G06F 3/0643
     USPC ....... 707/638, 694, 695, 704, 781, 801, 802, 707/823, 831; 711/6, 205, 220
     See application file for complete search history.

(56) References Cited

U.S. PATENT DOCUMENTS 8,341,130 B2 * 12/2012 Kaplan ................... G06F 16/11
     707/694
2011/0004630 A1 * 1/2011 LaBerge ............... G06F 16/185
     707/796

\* cited by examiner

*Primary Examiner* — Marcin R Filipczyk
(74) *Attorney, Agent, or Firm* — Baker Botts L.L.P.

(57) ABSTRACT

A system and method for efficient inode enumeration is disclosed. The system and method for enumerating inodes, comprises locating one or more inode files associated with the file system. For each of the one or more inode files, determining a physical address range for each inode within the inode file. The system and method further comprises creating a list of the physical address range for each of the inodes within the one or more inode files. The system and method comprises sorting the list based on physical addresses of the inodes.

9 Claims, 6 Drawing Sheets

| INODE | LOGICAL ADDRESS RANGE | PHYSICAL ADDRESS RANGE |
|---|---|---|
| 5 | 20 - 24k | VOLUME 0, OFFSET 0 |
| 10 | 40 - 44k | VOLUME 0, OFFSET 1M |
| 15 | 60 - 64k | VOLUME 0, OFFSET 4k |
| 20 | 80 - 84k | VOLUME 0, OFFSET 1M - 4k |

| INODE | LOGICAL ADDRESS RANGE | PHYSICAL ADDRESS RANGE |
|---|---|---|
| 5 | 20 - 24k | VOLUME 0, OFFSET 0 |
| 10 | 40 - 44k | VOLUME 0, OFFSET 1M |
| 15 | 60 - 64k | VOLUME 0, OFFSET 4k |
| 20 | 80 - 84k | VOLUME 0, OFFSET 1M - 4k |

*FIG. 4B*

| INODE | PHYSICAL ADDRESS RANGE |
|---|---|
| 5,15 | VOLUME 0, OFFSET 0 to 8k |
| 20,10 | VOLUME 0, OFFSET 1M - 4k to 1M + 4k |

*FIG. 4C*

SYSTEM AND METHOD FOR EFFICIENT INODE ENUMERATION

TECHNICAL FIELD

The present disclosure relates in general to file systems, and more particularly to a system and method for efficient inode enumeration.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

In addition, information handling systems may include a variety of hardware and software components that may be configured to process, store, and communicate information and may include one or more computer systems, data storage systems, and networking systems. In order to process and manage the information, a file system may be included in the information handling system. A file system may organize information in the form of files into an easily readable hierarchy to facilitate location and retrieval of the files. To organize the files a directory may be created in a file system to group the files associated with a specific application or use in a single location. A file may include data specific to the application or use. A file system may also include one or more inodes. While a file may include the data, the inode representing the file includes specific information, called metadata, regarding file ownership, access inode (e.g., read and/or write), execute permissions, and type. The inodes of a file system may be stored in files in the file system. In addition, an inode may have an integer number assigned to it to uniquely identify the inode within the file system.

In addition, given the large amount of files that may be present within a file system of an information handling system, efficient enumeration of the files within a file system to identify files that have certain attributes may be an important process underlying many applications. Enumerating the inode information for each file to located the files with the desired attributes may be a critical part of this process. For example, in the Dell Scalable File System (dsfs), system processes such as asynchronous snapshot based replication, snapshot storage reclaiming, storage scrubbing, and deduplication crawling processes use inode enumeration. These processes may involve the backup of data, the restoration of data, or the removal of stale data. In general, "backup" refers to making copies of data so that the additional copies may be used to restore an original set of data after a data loss event. For example, data backup may be useful to restore an information handling system to an operational state following a catastrophic loss of data (sometimes referred to as "disaster recovery"). In addition, data backup may be used to restore individual files after they have been corrupted or accidentally deleted.

The most common method for file enumeration may be performed by directory traversal. However, because each file within the file system may be created at different points in time and by different users, the order of traversal may not reflect the location of inodes on the disk. This creates an inefficiency that impacts access time and speed of enumeration. In addition, in some file systems (e.g., clustered file systems), consecutive objects enumerated through directory traversal may be located on separate storage devices, thus creating even more inefficiencies.

In addition sequentially enumerating the inodes in an inode file has similar issue with inefficiency. As the data in the file system of the information handling system increases, the inode files may become fragmented and slow due to the time and number of operations required to access the fragments on disk.

Accordingly, a need has arisen for systems and methods that efficient inode enumeration of file systems in an information handling systems.

SUMMARY

In accordance with the teachings of the present disclosure, disadvantages and problems associated with implementing network systems may be substantially reduced or eliminated.

A system and method for efficient inode enumeration is disclosed. The system and method for enumerating inodes, comprises locating one or more inode files associated with the file system. For each of the one or more inode files, determine a physical address range for each inode within the inode file. The system and method further comprises creating a list of the physical address range for each of the inodes within the one or more inode files. The system and method comprises sorting the list based on physical addresses of the inodes.

An article of manufacture for efficient inode enumeration is disclosed. The article of manufacture for enumerating inodes, comprises locating one or more inode files associated with the file system. For each of the one or more inode files, determine a physical address range for each inode within the inode file. The article of manufacture further comprises creating a list of the physical address range for each of the inodes within the one or more inode files. The article of manufacture comprises sorting the list based on physical addresses of the inodes.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 4A-C illustrates a method for managing inodes within a file system, in accordance with embodiments of the present disclosure.

DETAILED DESCRIPTION

Preferred embodiments and their advantages are best understood by reference to FIGS. 1-4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1A:
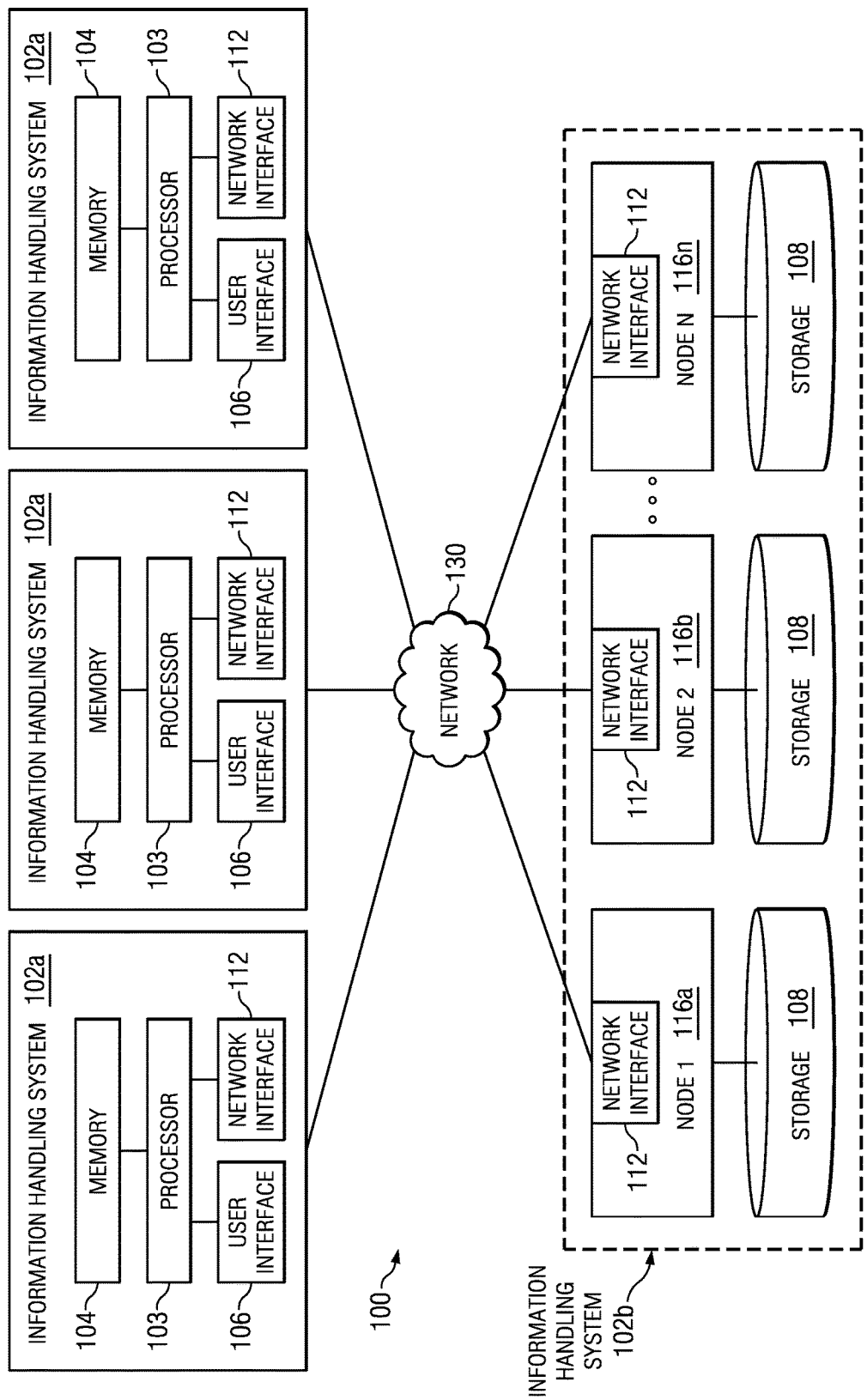
FIGS. 1A-1C illustrate block diagrams of an example system, in accordance with an embodiments of the present disclosure.
Figure 1B:
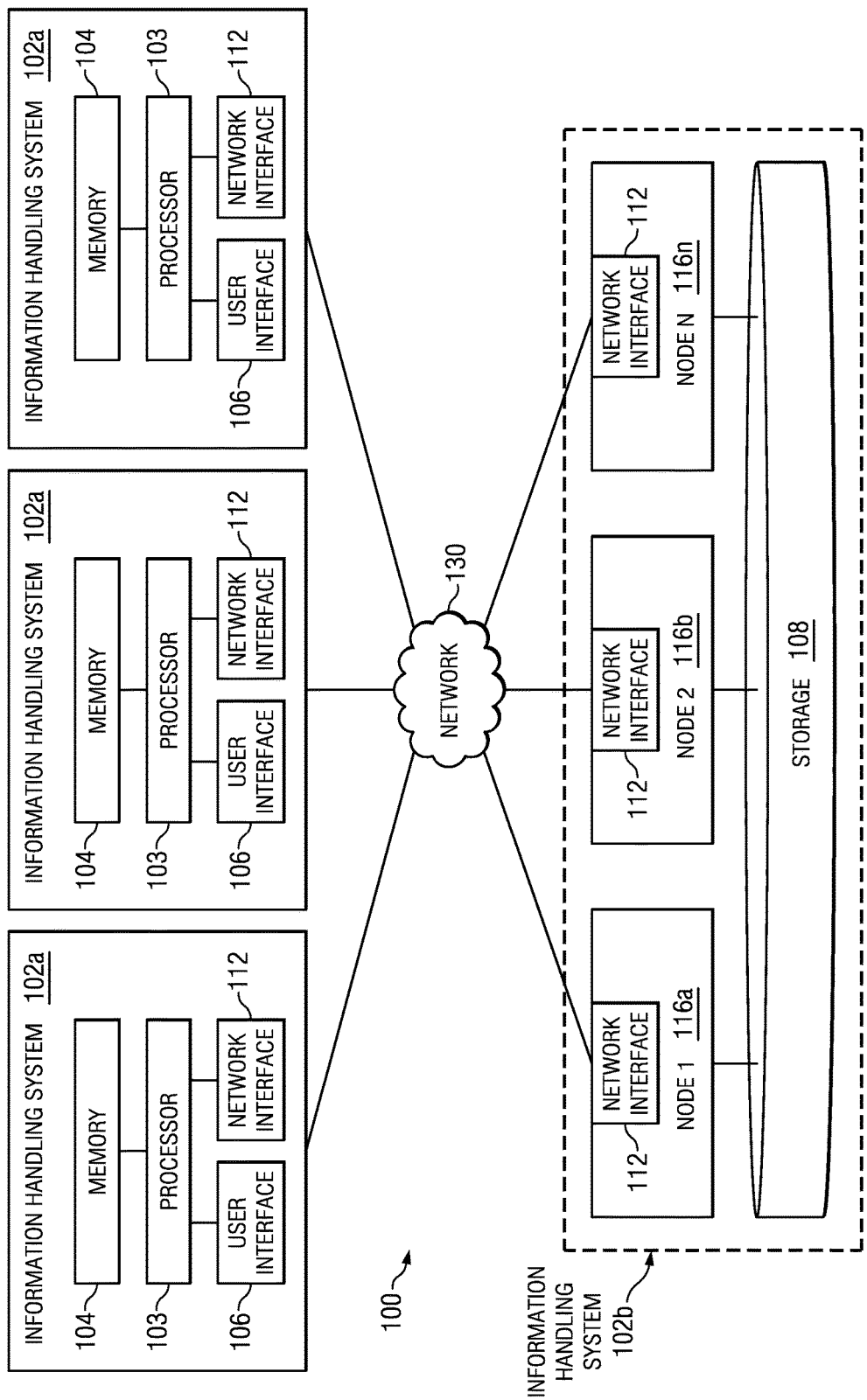
Figure 1C:
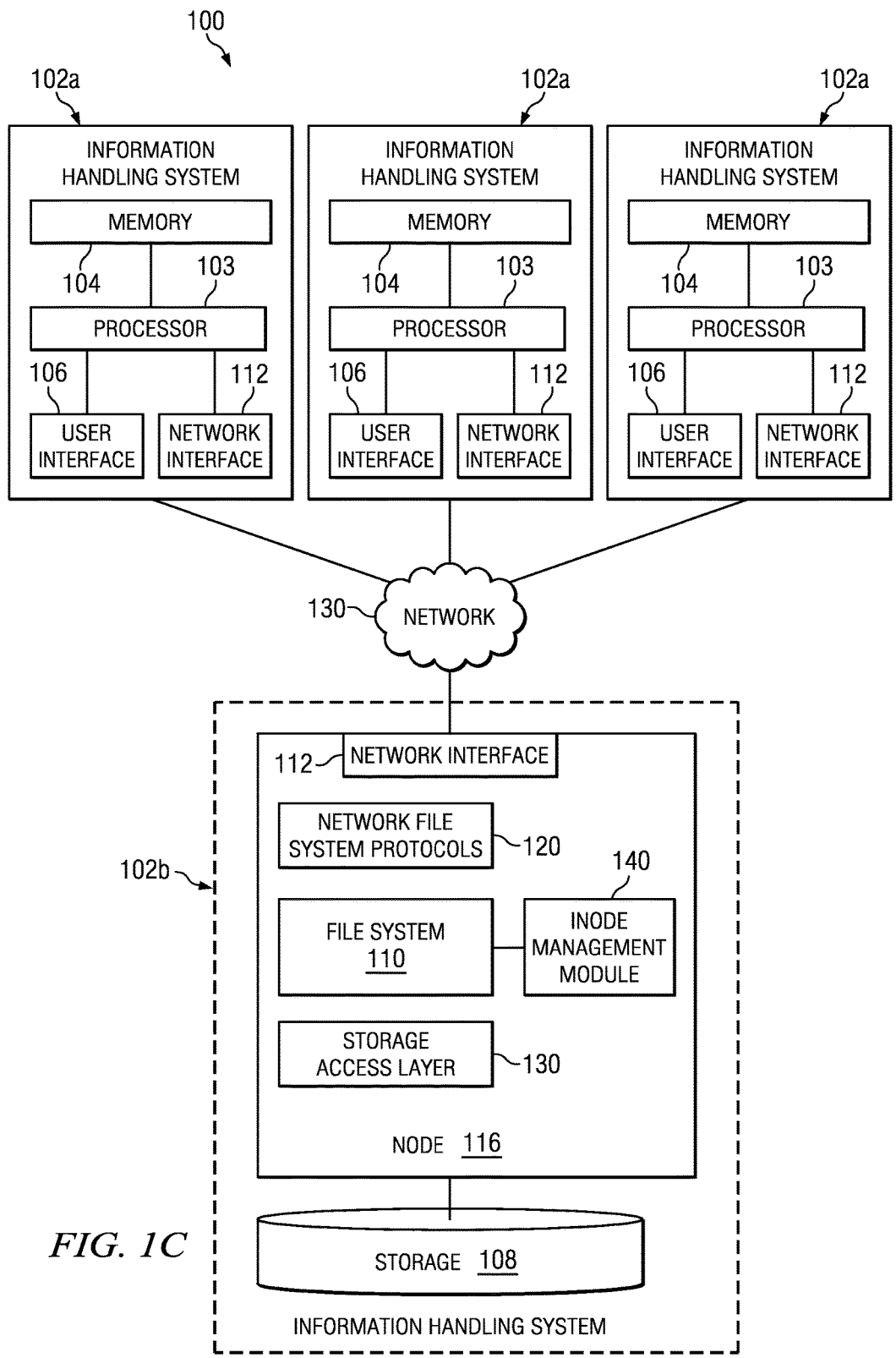

FIGS. 1A-1C illustrate block diagrams of example system 100, in accordance with embodiments of the present disclosure. As depicted, system 100 may include one or more information handling systems 102 and a network 130.

Information handling systems 102 may generally be operable to receive data from, and/or transmit data to other information handling systems via network 130. In one embodiment, an information handling system 102 (e.g., information handling system 102a) may be a personal computer adapted for home use. In the same or alternative embodiments, an information handling system 102 may be a personal computer adapted for business use. In the same or alternative embodiments, an information handling system 102 (e.g., information handling system 102b) may be a storage array configured to include multiple storage resources (e.g., hard drives) in order to manage large amounts of data. As shown in FIG. 1A, an information handling system 102a may include a processor 103, a memory 104 communicatively coupled to processor 103, a user interface 106, and a network interface 112. Information handling system 102b may include a storage resource 108, nodes 116, and network interface 112. As shown in FIG. 1A, each node 116 may have an individual storage resource 108. In addition, as shown in FIG. 1B, each node 116 may share a single storage resource 108. Nodes 116 will be discussed in detail in the description for FIG. 1C.

As shown in FIGS. 1A-1C, processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, inode management module 140, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

User interface 106 may be communicatively coupled to processor 103 and may include any instrumentality or aggregation of instrumentalities by which a user may interact with information handling system 102. For example, user interface 106 may permit a user to input data and/or instructions into information handling system 102 (e.g., via a keyboard, pointing device, and/or other suitable means), and/or otherwise manipulate information handling system 102 and its associated components. User interface 106 may also permit information handling system 102 to communicate data to a user, e.g., by means of a display device.

Network interface 112 may include any suitable system, apparatus, or device operable to serve as an interface between information handling system 102 and network 130. Network interface 112 may enable information handling system 102 to communicate via network 130 using any suitable transmission protocol (e.g., TCP/IP) and/or standard (e.g., IEEE 802.11, Wi-Fi). In certain embodiments, network interface 112 may include a network interface card (NIC) or a line card. In the same or alternative embodiments, network interface 112 may be configured to communicate with network 130 via wireless transmissions. In the same or alternative embodiments, network interface 112 may provide physical access to a networking medium and/or provide a low-level addressing system (e.g., through the use of Media Access Control addresses). In certain embodiments, network interface 112 may include a buffer for storing packets received from network 130 and/or a controller configured to process packets received by network 130.

Network 130 may include any system, device or apparatus operable to communicatively couple one or more devices together to form a network. Network 130 may be a part of a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). For example, network 130 may be configured to communicate with other devices via wireless transmissions, and thus may communicatively couple a plurality of wireless communication devices together to form a wireless network. Network 130 may also be configured to communicate to one or more devices via wire-line transmissions, and thus may relay data among wireless devices and wired devices. Network 130 may be configured to communicate with other devices via any suitable communication protocol (e.g., TCP/IP) and/or standard (e.g., IEEE 802.11, Wi-Fi).

Storage resource 108 may be communicatively coupled to processor 103 and/or memory 104 and may include any system, device, or apparatus operable to retain program instructions or data for a period of time (e.g., computer-readable media) and that retains data after power to information handling system 102 is turned off. Local storage resource 108 may include one or more hard disk drives, magnetic tape libraries, optical disk drives, magneto-optical disk drives, compact disk drives, compact disk arrays, disk array controllers, and/or any computer-readable medium operable to store data.

As depicted in FIG. 1C, information handling system 102b is shown, as an example only, as a single node 116 with storage resource 108 in order to show an example of components of node 116. Node 116 may include a file system 110, a network interface 112, a network file system protocol layer 120, a storage access layer 130 and an inode management module 140.

Network file system protocol layer 120 may include logic or software configured to allow data file accesses across a network 130. For example, network file system protocol layer 120 may allow multiple information handling systems 102a to access multiple information handling systems 102b regardless of the configuration of the "node" (e.g., information handling system 102b) as depicted in FIGS. 1A and 1B. In addition, although information handling systems 102 and network 130 are shown in a certain configuration, any number of information handling systems 102 and configurations of system 100 may be implemented without departing from the scope of the disclosure.

Storage access layer 130 may include logic or software embodied in computer tangible media configured to, when executed by a processor, implements disk storage protocols (e.g., RAID) or access protocols (e.g., SCSI). In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, and/or others.

File system 110 may include files that comprise data or applications operable, when executed by processor 103, to perform functions or provide data on information handling system 102. The files may be identified by a unique naming convention (e.g., data.txt, application.exe, etc). The files may be further identified by an inode. Inodes may include metadata, or a description of attributes, of a file. The inode may include information about file ownership, access inode (e.g., read and/or write), timestamps, device id., access permissions, file type, and pointers. The pointers in the inode may provide information regarding the physical location of the files. File system 110 may further organize data into structures called directories. Directories allow a user or system to group files according to use, functionality and/or other suitable grouping. Directories may also be included within directories as sub-directories to further organize the files. A file system may be further configured to span more than one information handling system. In addition, a file system may be accessible by multiple information handling systems via a network as defined by a Wide Area Network (WAN), Local Area Network(LAN) or Personal Area Network(PAN).

An example of a file system is a cluster file system which is often found in storage networks. A cluster file system may allow access to any file within the file system regardless of location. A network file storage device (e.g., a device that supports the network file system (NFS) protocol) may require a protocol (e.g., Internet protocol (IP)) to access files within a file system regardless of location. An example of a clustered file system is Dell's scalable file system.

Inode management module 140 may include resources such as processor 103 and memory 104, not explicitly shown in inode management module 140, configured to execute instructions operable to enumerate the files in a file system by enumerating the inodes. The enumeration may include checking the attributes of the enumerated files based on the information in the inode and taking action based on the results of the enumeration. As discussed above, inodes for a specific file may include information regarding file ownership, access inode (e.g., read and/or write), execute permissions, and file type. The inode may also include pointers that may be used to determine the physical address of a file's data. The enumerated list that inode management module 140 creates may be updated from time to time. In addition, inodes for files in a file system may be stored in other files which may be called inode files.

Although FIGS. 1A-1C depict information handling system 102 having only one storage resource 108, information handling system 102 may include any number of storage resources 108.

Although FIGS. 1A-1C depict information handling systems 102 communicatively coupled to network 130, any suitable number and/or type of devices may be communicatively coupled to network 130.

As mentioned above, system 100 may include many information handling systems 102. Each information handling system 102 may have a large amount of files that may be available to multiple users. As discussed above, the inode of each file may used to track and manage the files within a file system. The applications that may perform the management of files may utilize inode enumeration. As discussed above, common methods for inode enumeration such as directory traversal may have disadvantages such as fragmentation, for example. Fragmentation occurs when inodes in the inode files may be physically located in a different location. Another aspect of this fragmentation is that it may increase access time for files. To address these shortcomings, the present disclosure may provide systems and/or methods for enumerating inodes.

Figure 2:
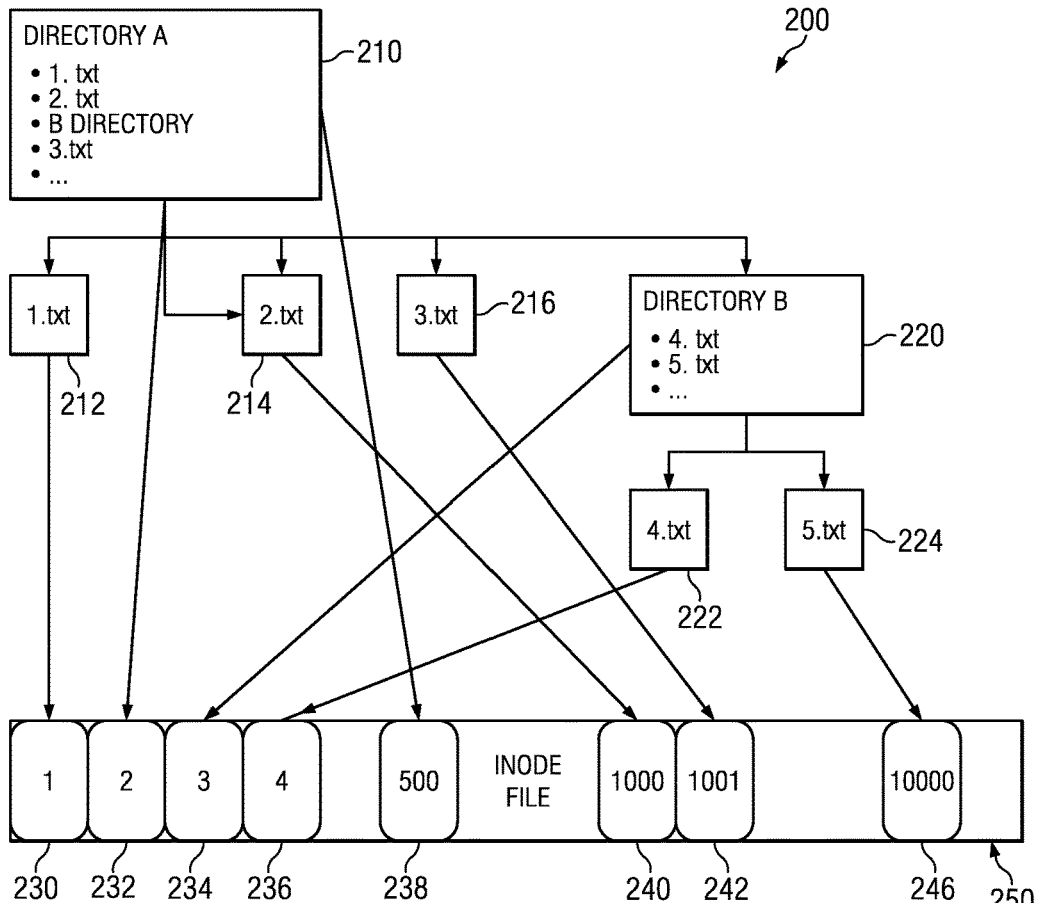
FIG. 2 illustrates a block diagram of a portion of an example file system and inode mappings in an information handling system, in accordance with embodiments of the present disclosure.

FIG. 2 illustrates a block diagram of a portion of an example file system 200 and inodes in an inode file 250 in an information handling system 102, in accordance with embodiments of the present disclosure. FIG. 2 may illustrate how a user may perceive a file system 200 or how file system 200 may be presented to a user. File system 200 may include directories (e.g., directories 210, 220) that include files with unique names that users can assign and easily recognize.

Another aspect of this infrastructure in a file system is inode file 250. Inode file 250 may include details of files that are useful for management of file system 200 without the data stored within files of the system. For example, in this embodiment, file system 200 may include directory 210. Directory 210 may further include files 212, 214 and 216. Each file, 212, 214 and 216 may include unique data or information. Each file, 212, 214 and 216 and directory 210 may have a unique inode that may include attributes (e.g., permissions, timestamps indicating last modified, physical location, etc). Directory 220 may also be included in directory 210. Directory 220 may include files 222 and 224. Each file 222 and 224 and directory 220 may include unique data or information and have a unique inode including attributes associated with each file (e.g., file 222 and 224). File system 200 may track the multiple inodes via an inode file 250. Inode file 250 may be updated periodically to reflect changes such as the addition of a file, for example, within file system 200. In this embodiment, for example, inode 230 may include attributes of text file 212. Inode 230 may also include a pointer to the location of file 212 in file system 200. Inode 230 may be created when file 212 is created or updated.

After creation of inode 230, inode 232 may be created. Inode 232 may have pointers to the physical location of text files 212, 214 and 216 and directory 220 included in the directory 210. Inode 234 may be created after inode 230 and 232. Inode 234 may include revised information about the physical location of directory 220 and its files 222 and 224 in directory 210. Inode 234 may also reflect changes in attributes to directory 220. At a later point in time, inode 236 may be created. Inode 236 may update the metadata or attributes for text file 222 to reflect the creation of or a change in text file 222. The change in text file 222 may be an attribute such as permissions or location due to edits in the file. Inode 238 may be created at a later time than inode file 236. Inode 238 may provide information resending an update of inode 232 in the inode file to reflect changes in files located in that directory since the last snapshot of the directory 210. Inode 240 may be created at a much later point in time to reflect addition of or updates to text file 214 in file system 200. Inode 242 may reflect addition of text or updates to file 216 in directory 210 in file system 200. Inode 246 may reflect the addition of or updates to text file 224 in directory 210 in file system 200. As discussed above, each file (e.g., text file 216) or directory (e.g., directory 210) may have a unique inode. The inode corresponding to each file may list attributes of each user visible file and file system object (e.g., directory) within file system 200.

In addition, in this example, it is noted that although the example directory and file structure visible to the user may be organized in a particular hierarchy, the inode data associated with each file and directory may be in a single inode file 250 that may not convey the hierarchy. Inode file 250 may simply list the inodes as they are created or updated but the files may not be physically or logically (e.g., as a user would "see" them in a directory listing) adjacent to each other. This will be discussed further in FIG. 3.

Although FIG. 2 discloses a particular number of files, directories and storage resources with respect to system 200, it is understood that system 200 may have greater or fewer directories, files and storage than those depicted in FIG. 2. In addition, although FIG. 2 discloses a certain type of files with respect to system 200, the types of files in system 200 may be of any suitable type. In addition, although one inode file 250 is shown, system 200 may have any number of inodes and/or inode files.

System 200 may be implemented using any configuration of files or directories location in the same or geographical disparate locations. In certain embodiments, system 200 may be implemented by any combination of hardware and software embodied in tangible computer-readable media.

Figure 3:
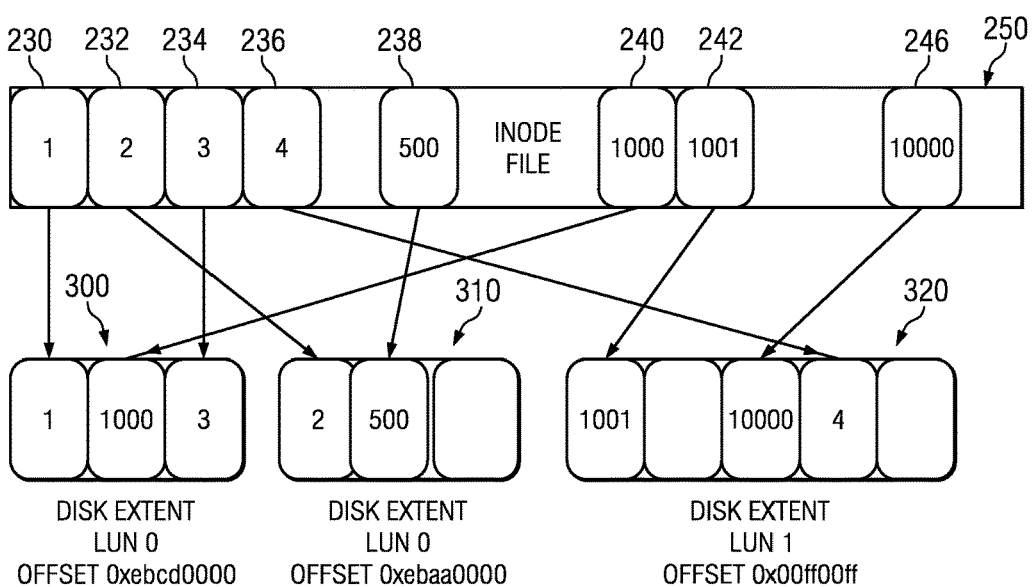
FIG. 3 illustrates a block diagram of an example inode mapping to disk locations in an information handling system, in accordance with embodiments of the present disclosure.

FIG. 3 illustrates a block diagram of an example inode mapping to physical disk locations in information handling system 102, in accordance with embodiments of the present disclosure. Inode file 250 depicted in FIG. 2 is shown again in FIG. 3. As discussed above, each inode may contain metadata attributes for a file within file system 200. FIG. 3 further depicts how inode file 250 is physically mapped to a storage resource. Inode file 250 includes the inodes for multiple user visible files and/or directories. Inode file 250 provides an easy way to organize the data, but may not directly correspond to the physical configuration of the files and/or directories. In addition, in general, storage resource use may be dynamic so most data within a file system may not be organized in a sequential order. For example, as depicted in FIG. 3, inodes 230, 232, 234 and 236 are located sequentially within inode file 250. However, the sequential inodes are located in physically different locations on the disk. Therefore, to access inodes 230-236 in sequential order, three separate disk extents or locations must be accessed.

Three disk extents are depicted in FIG. 3. A disk extent is a contiguous set of one or more disk sectors. The sectors can be within a partition or a volume in the disk. The disk extent may be identified by a logical unit number (LUN). In the example of FIG. 3, two LUNs are illustrated. Within each LUN, there may be a physical address to represent where the data resides in the storage resource. As an example, disk extent 300 may be located at address offset (e.g., 0xebcd0000) in LUN 0 of a disk in a storage resource. At that location, the data for inodes 230, 240 and 232 may be present. In the example of FIG. 3, the inodes may not have inodes identifiers (e.g. 1, 1000, 2) that are sequential. However, in physical storage, the data may be contiguous.

As another example, disk extent 310 may be located at a particular address offset (e.g., 0xebaa0000) in LUN 0. Disk extent 310 and disk extent 300 are in the same LUN 0 so they may logically be stored together or in proximity, but they may not be physically contiguous. Disk extent 310 may include the data for inodes 232 and 238 in physical memory at this location. In the example of FIG. 3, inodes 232 and 238 may have been created at different snapshots in time, but they are physically contiguous in storage.

As a further example, disk extent 320 may be located at a particular address offset (e.g., 0x00ffd0ff) in LUN1. LUN 0 and LUN 1 may be in different blocks of data within the same disk in a storage resource (e.g., storage resource 108) of information handling system 102. As discussed above, in the example of FIG. 3, disk extent 310 and disk extent 300 are in the same LUN or sector so they may logically be together, but they may not be physically contiguous in storage. However, LUN 1 is a different section with its own blocks of memory separate from LUN 0. In the example of FIG. 3, disk extent 320 may have the data for inodes 242, 246 and 236 in physical storage at this location. In the example of FIG. 3, inodes 242, 246 and 236 may have been created at different snapshots in time, but they are physically contiguous in LUN 320.

Although FIG. 3 discloses a particular number of inodes within an inode file, a specific number of LUNs, and a specific number of disk extents, it is understood that file system 200 may be comprised of a greater or lesser number of inodes within an inode file, LUNs within a disk and disk extent other than those depicted in FIG. 3, and may include a mapping or arrangement of inodes, LUNs, and disk extent other than that depicted in FIG. 3. In addition, although FIG. 3 discloses a certain mapping with respect to system 300, the mapping within system 300 may be completed in any suitable order.

Figure 4A:
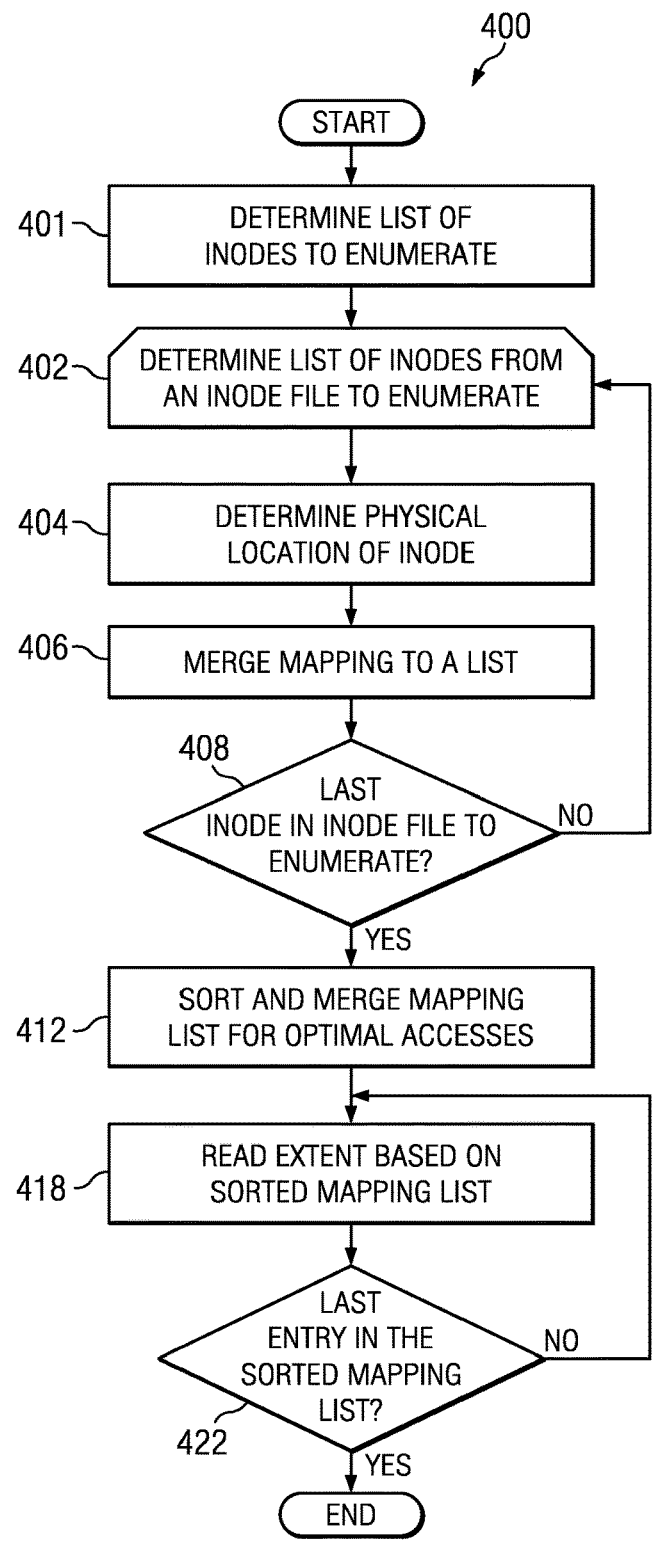

FIGS. 4A-4C illustrate a method for managing inodes within a file system, in accordance with embodiments of the present disclosure. As discussed above, when inodes are created, the inode number, or identifier may be sequential, but the data may be at different addresses or locations within physical storage. In addition, data with sequential inodes may be on separate disks in different locations. As the inode file list increases, it may be desired to have an efficient way to organize information set forth in inodes so that the information can be traversed quickly and efficiently. Inode enumeration may be used in numerous processes in a file system such as asynchronous snapshot based replication, snapshot storage reclaiming, storage scrubbing, and deduplication crawling processes, for example. The files including the inodes may be located on different disks within a system, on the same disk but at different physical addresses, or at contiguous addresses. In addition, if inode information is not effectively managed, there may be multiple accesses to disks that contribute to wear on the disk and consume significant time and processing resources.

At step 401, an inode management module (e.g., inode management module 140) may determine a list of inodes to enumerate. The criteria for the list may be dependent on the process or application enumerating the inodes.

At step 402, an inode management module (e.g., inode management module 140) may determine a list of inodes within a specific inode file to process. The individual inodes listed in the inode file may be located on different disks within the file system. In addition, the inodes listed within an individual inode file may have sequential inode numbers but the physical locations on the disks of the inode corresponding to the inode number may be different or non-contiguous.

At step 404, the inode management module may determine the physical address of an inode. This may determine the physical address of the inode in the inode file. For example, as shown in FIG. 4B, inode 5 may have the logical address range of 20-24 k in the inode file, but the physical address associated with inode 5 is Volume 0, Offset 0.

At step 406, the inode management module may merge the inode logical to physical mapping information into a list. This may create a single list that can be sorted or manipulated by an application or user needed to enumerate the files. For example, FIG. 4C depicts the merging of 4 inodes and their logical address range to physical address range mapping.

At step 408, if the last inode from the list determined in step 402 has not be processed, step 404 and 406 may be repeated. If the last inode information has been processed, the inode management module may continue to step 412.

At step 412, the merged list (e.g., FIG. 4C) created in the steps above may be sorted. For example, the inode management module may sort the list by local block address (LBA) to achieve an optimized list such that during disk reads there are minimal accesses to the disk. For example, if the inodes are sorted by their physical addresses, an operation that traverses inodes using the newly merged inode list may have less randomized disk accesses since the operation may read files that are adjacent to each other (by physical address) on the disk. In this example, the inode numbers in the list may not be sequential, but because the addresses are in order, the operation may minimize disk accesses. As a counter example, if the files were sorted by inode number, the addresses may be at random locations or addresses in the disks within the system. An operation that traverses the files by inode number may have to access a different disk each time as it traverses the inode numbers. In addition, at step 412, the list may also be processed during the sort operation to merge the inode mapping information for inodes that are on contiguous locations on the same disk. This creates disk extents such that a single read operation returns the information about all the inodes represented by the merged entry in the list. This reduces the number of read operations.

At step 418, the inode management module may read the extent based on the sorted information from the mapping list. An extent is a set of contiguous blocks of memory allocated on a disk created as a result of the merge operation in step 412. For example, as shown in FIG. 4C, if an extent located at Volume 0, Offset 0 to 8 k is read, the information associated with inodes 5 and 15 may be read.

At step 422, the inode management module may determine if the last entry in the sorted merged list has been processed. If the last entry has not been processed, method 400 may return to step 418. Otherwise, if the last inode has been processed, method 400 may end.

Although FIG. 4 discloses a particular number of steps to be taken with respect to method 400, it is understood that method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software embodied in tangible computer-readable media.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
   a processor;
   a memory coupled to the processor;
   a network interface coupled to the processor and configured to interface to a network; and
   one or more non-transitory computer-readable media communicatively coupled to the processor and having stored thereon:
   a file system;
   wherein the file system includes one or more files and one or more directories; and
   an inode management module configured to:
      locate a plurality of inode files associated with the file system;
      identify one or more inodes within the plurality of inode files, each of the one or more inodes including a pointer to a first physical address representing a location of data of a file;
      for each of the one or more inodes, determine a physical address range representing a location of the inode, the physical address range including a second physical address and an offset;
      create a list including, for each of the one or more inodes, the physical address range representing the location of the inode;

sort the list based on the physical address range for each of the one or more inodes and not based on respective identifiers of the one or more inodes; and during an operation in which the one or more inodes are traversed, traverse the one or more inodes in accordance with the sorted list.

2. An information handling system according to claim 1, wherein the inode management module is further configured to, for each of the plurality of inode files, determine a list of inodes to enumerate.

3. An information handling system according to claim 1, wherein the operation is an input-output operation.

4. A method for enumerating inodes, comprising:

locating a plurality of inode files associated with a file system;

identifying one or more inodes within the plurality of inode files, each of the one or more inodes including a pointer to a first physical address representing a location of data of a file;

for each of the one or more inodes, determining a physical address range representing a location of the inode, the physical address range including a second physical address and an offset;

creating a list including, for each of the one or more inodes, the physical address range representing the location of the inode;

sorting the list based on the physical address range for each of the one or more inodes and not based on respective identifiers of the one or more inodes; and during an operation in which the one or more inodes are traversed, traversing the one or more inodes in accordance with the sorted list.

5. A method according to claim 4, wherein the operation is an input-output operation.

6. A method according to claim 4, further comprising, for each of the plurality of inode files, determining a list of inodes to enumerate.

7. An article of manufacture, comprising:

a non-transitory computer-readable medium;

computer-executable instructions carried on the non-transitory computer-readable medium, the instructions readable by an information handling system, the instructions, when executed, causing a processor to:

locate a plurality of inode files associated with a file system;

identify one or more inodes within the plurality of inode files, each of the one or more inodes including a pointer to a first physical address representing a location of data of a file;

for each of the one or more inodes, determine a physical address range representing a location of the inode, the physical address range including a second physical address and an offset;

create a list including, for each of the one or more inodes, the physical address range representing the location of the inode;

sort the list based on the physical address range for each of the one or more inodes and not based on respective identifiers of the one or more inodes; and during an operation in which the one or more inodes are traversed, traverse the one or more inodes in accordance with the sorted list.

8. An article of manufacture according to claim 7, wherein the operation is an input-output operation.

9. An article of manufacture according to claim 7, the instructions, when executed, further causing a processor to, for each of the plurality of inode files, determine a list of inodes to enumerate.

\* \* \* \* \*